US009256326B2

(12) United States Patent
Jang

(10) Patent No.: US 9,256,326 B2
(45) Date of Patent: Feb. 9, 2016

(54) METHOD OF FABRICATING TOUCH SCREEN PANEL

(75) Inventor: Brent Jang, Yongin (KR)

(73) Assignee: Samsung Display Co., Ltd. (KR)

( * ) Notice: Subject to any disclaimer, the term of this patent is extended or adjusted under 35 U.S.C. 154(b) by 467 days.

(21) Appl. No.: 13/010,723

(22) Filed: Jan. 20, 2011

(65) Prior Publication Data

US 2012/0075207 A1 Mar. 29, 2012

(30) Foreign Application Priority Data

Sep. 29, 2010 (KR) ........................ 10-2010-0094225

(51) Int. Cl.
H05K 3/02 (2006.01)
H05K 3/10 (2006.01)
G06F 3/044 (2006.01)

(52) U.S. Cl.
CPC ...... *G06F 3/044* (2013.01); *G06F 2203/04103* (2013.01); *G06F 2203/04111* (2013.01); *Y10T 29/49002* (2015.01)

(58) Field of Classification Search
CPC ................ G06F 3/044; G06F 3/03547; G06F 2203/04103; G06F 2203/04111; Y10T 29/49002; Y10T 29/49117
USPC .................. 29/825, 829, 831, 842, 846, 850; D14/318, 389; 345/173–176
See application file for complete search history.

(56) References Cited

U.S. PATENT DOCUMENTS

| 2003/0048256 | A1* | 3/2003 | Salmon ......................... 345/168 |
| 2006/0063351 | A1* | 3/2006 | Jain ............................... 438/455 |
| 2010/0134436 | A1 | 6/2010 | Jeong et al. |

FOREIGN PATENT DOCUMENTS

| KR | 10-2005-0105592 A | 11/2005 |
| KR | 10-2007-0047114 A | 5/2007 |
| KR | 10-2008-0073941 A | 8/2008 |
| KR | 10-2009-0102065 A | 9/2009 |
| KR | 10-2010-0061993 | 6/2010 |
| KR | 10-2010-0093204 | 8/2010 |

OTHER PUBLICATIONS

Office Action dated Jul. 31, 2013 in priority Korean Patent Application No. 10-2010-0094225.
Notice of Allowance dated Mar. 27, 2014 in Korean priority Application No. 10-2010-0094225.

* cited by examiner

Primary Examiner — Peter DungBa Vo
Assistant Examiner — Jeffrey T Carley
(74) Attorney, Agent, or Firm — Knobbe Martens Olson & Bear LLP

(57) ABSTRACT

A fabricating method of a display device includes: forming a thin film by coating a liquid polymer material over a substrate using spin coating or slit coating; forming a touch screen panel (TSP) over the thin film; separating the substrate from the thin film; and placing the TSP over a surface of the display device. The TSP includes: first and second sensing patterns alternately arranged, the first sensing patterns formed to be connected to one another for each column, the second sensing patterns formed to be connected to one another for each row; first connection lines electrically connecting the first sensing patterns; connection patterns connecting the second sensing patterns and formed in a different layer from the first and second sensing patterns; and a first insulating layer formed between the connection patterns and the first and second sensing patterns. The sensing patterns are formed of a transparent conductive material.

5 Claims, 3 Drawing Sheets heat or laser beam

METHOD OF FABRICATING TOUCH SCREEN PANEL

CROSS-REFERENCE TO RELATED APPLICATIONS

This application claims priority to and the benefit of Korean Patent Application No. 10-2010-0094225, filed on Sep. 29, 2010, in the Korean Intellectual Property Office, the entire content of which is incorporated herein by reference.

BACKGROUND

1. Field

An aspect of the present disclosure relates to a touch screen panel provided to a display device and the like.

2. Description of the Related Technology

A touch screen panel is an input device that allows a user's instruction to be inputted by selecting an instruction content displayed on a screen of a display device or the like with the user's hand or another object.

A touch screen panel is formed on a front face of a display device to convert a contact position into an electrical signal. The user's hand or another object may be directly in contact with the touch screen panel at the contact position. Accordingly, the instruction content selected at the contact position is inputted as an input signal to the display device.

Since such a touch screen panel can be substituted for a separate input device connected to a display device, such as a keyboard or mouse, its application fields have been gradually extended.

Some touch screen panel types are: a resistive overlay touch screen panel, a photosensitive touch screen panel, a capacitive touch screen panel, and the like. A capacitive touch screen panel converts a contact position into an electrical signal by sensing a change in capacitance formed between a conductive sensing pattern and an adjacent sensing pattern, ground electrode or the like when a user's hand or another object is in contact with the touch screen panel.

SUMMARY OF CERTAIN INVENTIVE ASPECTS

Embodiments provide an ultra thin touch screen panel implemented by forming a thin film on a glass substrate as a carrier substrate, forming sensing patterns as touch sensors on the film and then separating the glass substrate as the carrier substrate from the film.

According to one aspect, there is provided a fabricating method of a display device including a touch screen panel, the method including: coating a liquid polymer material over a substrate, thereby forming a thin film, forming a touch screen panel over the thin film, separating the carrier substrate from the thin film and placing the touch screen panel over a surface of the display device.

The liquid polymer material may include polyimide. The thickness of the thin film may be less than about 1/10 of the thickness of the substrate.

The touch screen panel may include first and second sensing patterns alternately arranged, the first sensing patterns being formed to be connected to one another for each column having the same X coordinate, the second sensing patterns being formed to be connected to one another for each row having the same Y coordinate, first connection lines that electrically connect the first sensing patterns, connection patterns formed in a different layer from the first and second sensing patterns, the connection patterns electrically connecting the second sensing patterns; and a first insulating layer formed between the connection patterns and the first and second sensing patterns.

The separating of the carrier substrate from the thin film may include instantaneously applying heat to a bottom surface of the substrate or scanning and irradiating a laser beam to a bottom surface of the substrate.

According to another aspect, there is provided a touch screen panel including: first and second sensing patterns formed to be alternately arranged on a thin film, the first sensing patterns being formed to be connected to one another for each column having the same X coordinate, the second sensing patterns being formed to be connected to one another for each row having the same Y coordinate; first connection lines that electrically connect the first sensing patterns, connection patterns formed in a different layer from the first and second sensing patterns, the connection patterns electrically connecting the second sensing patterns, and a first insulating layer formed between the connection patterns and the first and second sensing patterns.

The thin film may be include a polyimide material. The thickness of the thin film may be between about 0.005 to about 0.05 mm.

As described above, according to certain embodiments, an ultra thin film touch screen panel is implemented, so that the touch sensing operation of the touch screen panel can be performed while minimizing an increase of the thickness of the touch screen panel by attaching the touch screen panel to a display upper surface or window lower surface of a flat panel display device.

BRIEF DESCRIPTION OF THE DRAWINGS

The accompanying drawings, together with the specification, illustrate exemplary embodiments.

DETAILED DESCRIPTION OF CERTAIN INVENTIVE EMBODIMENTS

Figure 1:
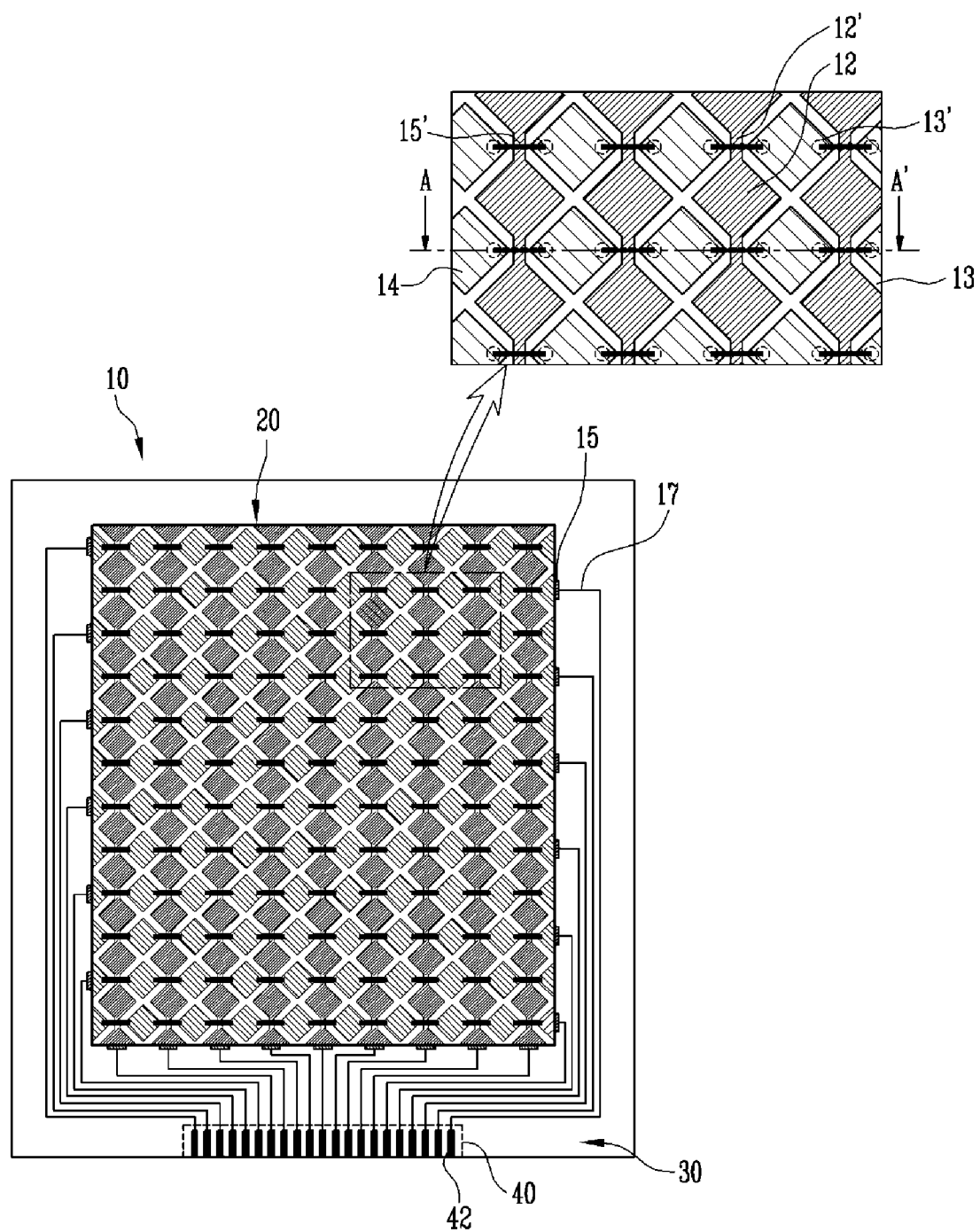
FIG. 1 is a plan view of an embodiment of a touch screen panel.

In the following detailed description, only certain exemplary embodiments of the present invention have been shown and described, simply by way of illustration. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

A touch screen panel is generally attached to an outer surface of a flat display device such as a liquid crystal display device or an organic light emitting display device so as to be implemented as a product. Therefore, the touch screen panel requires characteristics of high transparency and thin thickness.

Since a thin-film growing process, a pattern forming process and the like are required to form touch sensors, the capacitive touch screen panel requires characteristics of high heat resistance and high chemical resistance.

Conventionally, in the capacitive touch screen panel, touch sensors were formed on a glass substrate. However, since the glass substrate itself should have a thickness to some extent so as to be transferred in a process, the touch screen panel becomes thicker.

Hereinafter, exemplary embodiments will be described in detail with reference to the accompanying drawings.

Figure 2:
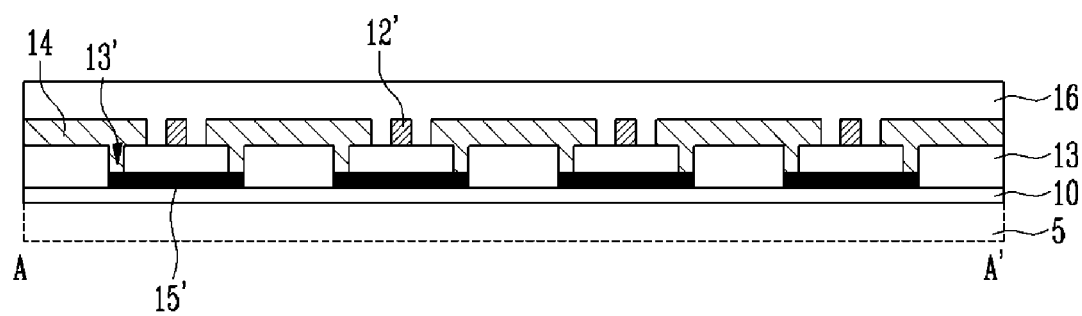
FIG. 2 is a sectional view of part (A-A') of FIG. 1.

FIG. 1 is a plan view of an embodiment of a touch screen panel. FIG. 2 is a sectional view of part (A-A') of FIG. 1.

Referring to FIGS. 1 and 2, an embodiment of a touch screen panel includes a plurality of sensing patterns 12 and 14 formed on a transparent thin film 10, and metal pads 15 and sensing lines 17 electrically connected to the sensing patterns.

The transparent thin film 10 is formed by coating a liquid polymer material as a thin film on a carrier substrate 5. In some embodiments, the carrier substrate 5 may be made of a glass material.

The coating may be performed using a spin coating, a slit coating, or similar method. The liquid polymer material has characteristics of transparency, high heat resistance and high chemical resistance, and may, in some embodiments, include polyimide (PI).

The thickness of the thin film 10 formed on the carrier substrate 5 through the coating may be between about 0.005 to about 0.05 mm. Once the plurality of sensing patterns and the metal pads 15 and sensing lines 17 electrically connected to the sensing patterns are formed on the thin film 10, the thin film 10 is separated from the carrier substrate 5, thereby implementing an ultra thin touch screen panel.

The carrier substrate 5 indicated by a dotted line in FIG. 2 is not included in the finished touch screen panel, but is a component used and then removed during a fabricating process of the touch screen panel. An embodiment of a fabricating method of the touch screen panel will be described in detail below with reference to FIGS. 3A-3C.

The area in which the plurality of sensing patterns 12 and 14 are formed on the thin film 10 is a display area 20 in which an image is displayed and a touch position is detected. The area in which the metal pads 15 and sensing lines 17 electrically connected to the sensing patterns and a flexible printed circuit (FPC) bonding pad portion 40 including a plurality of bonding pads 42 respectively connected to the sensing lines 17 are formed on the thin film 10 is a non-display area 30 provided at the outside of the display area 20.

The sensing patterns formed in the display area 20 are alternately arranged, and include first and second sensing patterns 12 and 14 formed to be connected to one another for each column having the same X coordinate or each row having the same Y coordinate.

The first sensing patterns 12 are arranged along a first direction (column direction) for each column having the same X coordinate, and adjacent first sensing patterns 12 are electrically connected by first connection lines 12'.

The second sensing patterns 14 are arranged along a second direction (row direction) for each row having the same Y coordinate.

In one embodiment, the first and second sensing patterns 12 and 14 are formed in the same layer. The first and second sensing patterns 12 and 14 are formed of a transparent material. The first and second sensing patterns 12 and 14 may be formed of a transparent conductive material, such as, for example, indium tin oxide (ITO).

In order for the first and second sensing patterns 12 and 14 to serve as sensing electrodes, the sensing cells arranged along the first direction are connected electrically to one another, and the sensing cells arranged along the second direction are connected electrically to one another.

Accordingly, the first sensing patterns 12 are electrically connected to one another by the first connection lines 12'. However, since the second sensing patterns 14 are formed in the same layer as the first sensing patterns 12, connection lines respectively intersected with the first connection lines 12' are not formed in the same layer so as to prevent short circuits with the first connection lines 12'.

In one embodiment, connection patterns 15' that electrically connect the respective second sensing patterns 14 are formed in a different layer from the first sensing patterns 12. The connection patterns 15' are formed in a lower layer of the first and second sensing patterns 12 and 14.

In embodiments of the touch screen panel, the connection patterns 15' are formed on the transparent thin film 10, and a first insulating layer 13 is formed on the thin film 10 including the connection patterns 15'.

The connection patterns 15' may be formed of the same ITO as the first and second sensing patterns 12 and 14, or may be formed of a metallic material having a lower resistance than the ITO.

In some embodiments, the connection pattern 15' may be formed in the shape of a rectangular bar as shown in these figures. In other embodiments, the connection patterns 15' may be implemented so that the width of an end portion of each of the connection pattern 15', which is a portion exposed by a contact hole 13', is wider than that of the other portion of each of the connection pattern 15'.

The connection pattern 15' is intersected with the first connection line 12' that connect the first sensing patterns 12. The width of the connection pattern 15' may be minimized so as to reduce the influence of parasitic capacitance generated by the intersection.

Where the width of the connection pattern 15' is minimized, the line resistance of each of the second sensing patterns 14 is increased. As a result, sensing sensitivity for implementing a function of the touch screen panel is lowered.

Accordingly, the connection pattern 15' may be formed of a conductive material having low resistance.

The connection pattern 15' may be formed of the same material as the metal pad 15 formed in an edge of the area in which the first and second sensing patterns 12 and 14 are formed so as to supply a sensed signal to a driver circuit (not shown). Since the connection pattern 15' is formed in the same layer through the same process as the metal pad 15, an additional mask process is not required to forming the connection pattern 15'.

Thus, the connection pattern 15' is not formed of the same transparent conductive electrode material as the first and second sensing patterns 12 and 14, so that it is possible to prevent line resistance from being increased and to overcome a disadvantage that a mask process is necessarily added to form the connection pattern 15'. A second insulating layer 16 is formed on the first and second sensing patterns 12 and 14.

Figure 3A:
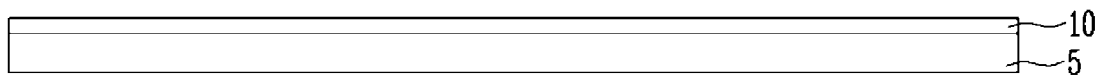
FIGS. 3A to 3C are sectional views illustrating an embodiment of a fabricating method of an embodiment of a touch screen panel.
Figure 3B:
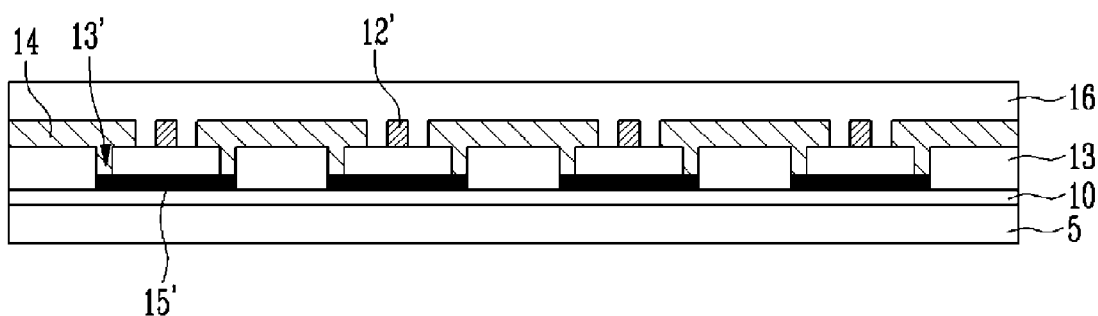
Figure 3C:
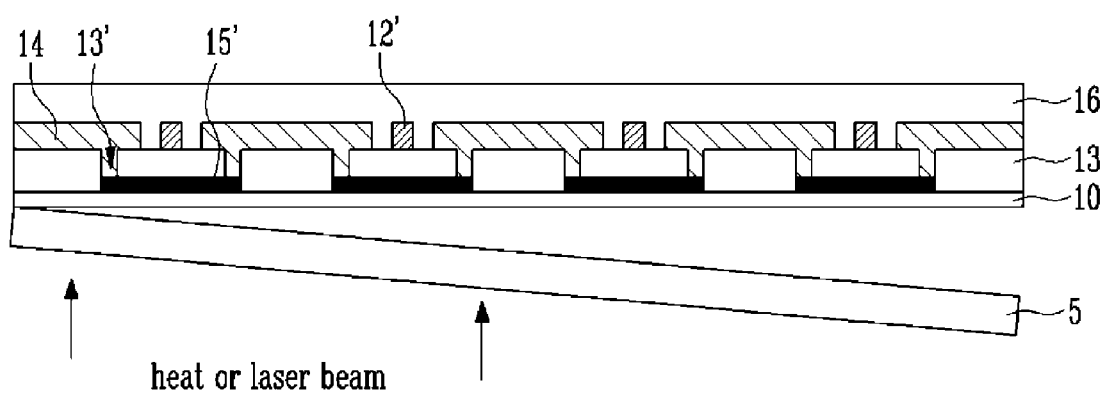

FIGS. 3A to 3C are sectional views illustrating an embodiment of a fabricating method of the touch screen panel.

For convenience of illustration, the fabricating method with respect to the sectional view of the specific part (A-A') of the touch screen panel shown in FIG. 1, i.e., the area shown in FIG. 2, will be described in FIGS. 3A to 3C.

Referring to FIG. 3A, a thin film 10 is formed by coating a liquid polymer material on a glass substrate 5 as a carrier substrate.

The glass substrate 5 has a thickness of about 0.5 mm, and the thin film 10 formed through the coating has a thickness of about 0.005 to about 0.05 mm. The thin film 10 may be formed to have a thickness which is about less than about ⅒ of the thickness of the glass substrate 5.

The liquid polymer material has characteristics of transparency, high heat resistance and high chemical resistance, and, in some embodiments, may include polyimide (PI).

The coating may be performed using a spin coating, a slit coating, or a similar method. As described above, the liquid polymer material is formed as a transparent film through a coating and curing process.

Referring to FIGS. 1, 2 and 3B, a touch screen panel is formed on the thin film 10. The touch screen panel includes a plurality of sensing patterns 12 and 14, and metal pads 15 and sensing lines 17 electrically connected to the sensing patterns 12 and 14.

The area in which the plurality of sensing patterns 12 and 14 are formed on the thin film 10 is a display area 20 in which an image is displayed and a touch position is detected. The area in which bonding pads 42 electrically connected to the sensing patterns 12 and 14 and the sensing lines 17 are formed on the thin film 10 is a non-display area 30 provided at the outside of the display area 20.

In FIG. 3B, a section with respect to a specific part of the display area will be described.

The sensing patterns include first and second sensing patterns 12 and 14 formed to be connected to one another for each column having the same X coordinate or each row having the same Y coordinate.

The first sensing patterns 12 are arranged along a first direction (column direction) for each column having the same X coordinate, and adjacent first sensing patterns 12 are electrically connected by first connection lines 12'.

The second sensing patterns 14 are arranged along a second direction (row direction) for each row having the same Y coordinate. The respective second sensing patterns 14 are electrically connected by connection patterns 15' formed in a different layer from the first and second sensing patterns 12 and 14, e.g., a lower layer of the first and second sensing patterns 12 and 14.

In embodiments of the touch screen panel, the connection patterns 15' are formed on the transparent thin film 10, and a first insulating layer 13 is formed on the thin film 10 including the connection patterns 15'.

A second insulating layer 16 is formed on the first and second sensing patterns 12 and 14.

The first and second sensing patterns 12 and 14 are formed of a transparent material. Therefore, the first and second sensing patterns 12 and 14 may be formed of a transparent conductive material, such as, for example, indium tin oxide (ITO).

The connection patterns 15' may be formed of the same material as the first and second sensing patterns 12 and 14, or may be formed of a metallic material having a lower resistance than ITO.

Once components of the touch screen panel are all formed on the thin film 10, the glass substrate 5 as the carrier substrate is separated from the thin film 10 as shown in FIG. 3C.

The glass substrate 5 is separated from the thin film 10 without damaging the components formed on the thin film 10.

The glass substrate 5 may be separated from the thin film 10 by using a difference in thermal expansion degree or by using a laser beam.

A separating method using a difference in thermal expansion degree uses a difference between thermal expansion coefficients of the glass substrate 5 and the coated thin film 10. If the glass substrate 5 of which bottom surface is adhered to a heating plate (not shown) is instantaneously heated, the thin film 10 attached to the top surface of the glass substrate 5 is separated from the glass substrate 5.

In a separating method using a laser beam, a laser beam is scanned and irradiated onto the bottom surface of the glass substrate 5, and the interface between the glass substrate 5 and the thin film 10 attached to the top surface of the glass substrate 5 is separated.

In embodiments of the touch screen panel, the sensing patterns 12 and 14 and the like are formed on the thin film 10. Accordingly, the thickness of the touch screen panel is minimized, so that an increase of the thickness of the touch screen panel can be minimized when the touch screen panel is attached to a display upper surface or a window lower surface that is a cover for display protection.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fabricating method of a display device including a touch screen panel, the method comprising:
   coating a liquid polymer material over a substrate using at least one of spin coating and slit coating, thereby forming a thin film;
   forming a touch screen panel over the thin film, wherein the touch screen panel comprises:
      first and second sensing patterns alternately arranged, the first sensing patterns being formed to be connected to one another for each column having the same X coordinate, the second sensing patterns being formed to be connected to one another for each row having the same Y coordinate, wherein the first and second sensing patterns are formed of a transparent conductive material;
      first connection lines that electrically connect the first sensing patterns;
      connection patterns formed in a different layer from the first and second sensing patterns, the connection patterns electrically connecting the second sensing patterns; and
      a first insulating layer formed between the connection patterns and the first and second sensing patterns;
   separating the substrate from the thin film; and
   placing the touch screen panel over a surface of the display device.

2. The method according to claim 1, wherein the liquid polymer material comprises polyimide.

3. The method according to claim 1, wherein a thickness of the thin film is less than about ⅒ of a thickness of the substrate.

4. The method according to claim 1, wherein the separating of the substrate from the thin film comprises instantaneously applying heat to a bottom surface of the substrate.

5. The method according to claim 1, wherein the separating of the carrier substrate from the thin film is comprises scanning and irradiating a laser beam to a bottom surface of the substrate.

* * * * *